(12) United States Patent
Yushina

(10) Patent No.: US 9,720,755 B2
(45) Date of Patent: Aug. 1, 2017

(54) INFORMATION PROCESSING DEVICE

(71) Applicant: NEC Corporation, Tokyo (JP)

(72) Inventor: Ryota Yushina, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/775,996

(22) PCT Filed: Feb. 19, 2014

(86) PCT No.: PCT/JP2014/000841
§ 371 (c)(1),
(2) Date: Sep. 14, 2015

(87) PCT Pub. No.: WO2014/141593
PCT Pub. Date: Sep. 18, 2014

(65) Prior Publication Data
US 2016/0034335 A1    Feb. 4, 2016

(30) Foreign Application Priority Data
Mar. 15, 2013    (JP) ................. 2013-053946

(51) Int. Cl.
*G06F 11/07*     (2006.01)
*G06F 11/30*     (2006.01)
*G06F 11/14*     (2006.01)

(52) U.S. Cl.
CPC ...... *G06F 11/0772* (2013.01); *G06F 11/0712* (2013.01); *G06F 11/0751* (2013.01);
(Continued)

(58) Field of Classification Search
CPC ............. G06F 11/3466; G06F 11/3055; G06F 11/3672; G06F 11/0751; G06F 11/07;
(Continued)

(56) References Cited

U.S. PATENT DOCUMENTS 5,805,790 A * 9/1998 Nota ............... G06F 11/203
714/10
8,656,217 B2   2/2014 Niesser
(Continued)

FOREIGN PATENT DOCUMENTS

CN    101938368 A    1/2011
CN    102591736 A    7/2012
(Continued)

OTHER PUBLICATIONS

Supplementary European Search Report dated Oct. 13, 2016 in corresponding European Patent Application No. 14763272.3.
(Continued)

*Primary Examiner* — Nadeem Iqbal
(74) *Attorney, Agent, or Firm* — Young & Thompson

(57) ABSTRACT

An information processing device includes: a virtual machine built in the information processing device and able to use a physical device included by the information processing device; and an information processing device failure managing unit for detecting a failure in the information processing device. The virtual machine includes: a virtual machine failure managing unit for detecting a failure in the physical device which the virtual machine can use; and a failure notifying unit for notifying occurrence of a failure in the physical device detected by the virtual machine failure managing unit to the information processing device failure managing unit.

12 Claims, 8 Drawing Sheets

(52) U.S. Cl.
CPC ...... *G06F 11/0787* (2013.01); *G06F 11/1484* (2013.01); *G06F 11/30* (2013.01)

(58) Field of Classification Search
CPC .... G06F 11/30; G06F 11/1484; G06F 11/203; G06F 9/45558; G06F 9/45533; G06F 9/4856; G06F 9/5038
See application file for complete search history.

(56) References Cited

U.S. PATENT DOCUMENTS

| | | | | |
|---|---|---|---|---|
| 8,793,707 | B2* | 7/2014 | Takaoka | H04L 41/5035 719/318 |
| 9,116,803 | B1* | 8/2015 | Agrawal | G06F 11/0751 |
| 9,256,507 | B2 | 2/2016 | Takaoka et al. | |
| 2008/0263407 | A1* | 10/2008 | Yamamoto | G06F 11/0712 714/44 |
| 2010/0083250 | A1* | 4/2010 | Nakai | G06F 11/079 718/1 |
| 2011/0004708 | A1* | 1/2011 | Kondo | G06F 3/0614 710/38 |
| 2013/0166953 | A1* | 6/2013 | Tanaka | G06F 11/079 714/25 |

FOREIGN PATENT DOCUMENTS

| | | |
|---|---|---|
| CN | 102693177 A | 9/2012 |
| JP | 2008-269194 | 11/2008 |
| JP | 2009-151509 | 7/2009 |
| JP | 2010-039987 | 2/2010 |
| JP | 2012-118841 | 6/2012 |
| JP | 2012-198651 | 10/2012 |
| WO | 2012/164616 | 12/2012 |

OTHER PUBLICATIONS

Korean Office Action dated Jun. 13, 2016; Application No. 2015-7025158.
International Search Report, PCT/JP2014/000841, Apr. 1, 2014.
Japanese Official Action—2015-505253—Aug. 9, 2016.
Chinese Office Action dated Apr. 19, 2017; Application No. 201480027254.0.

* cited by examiner

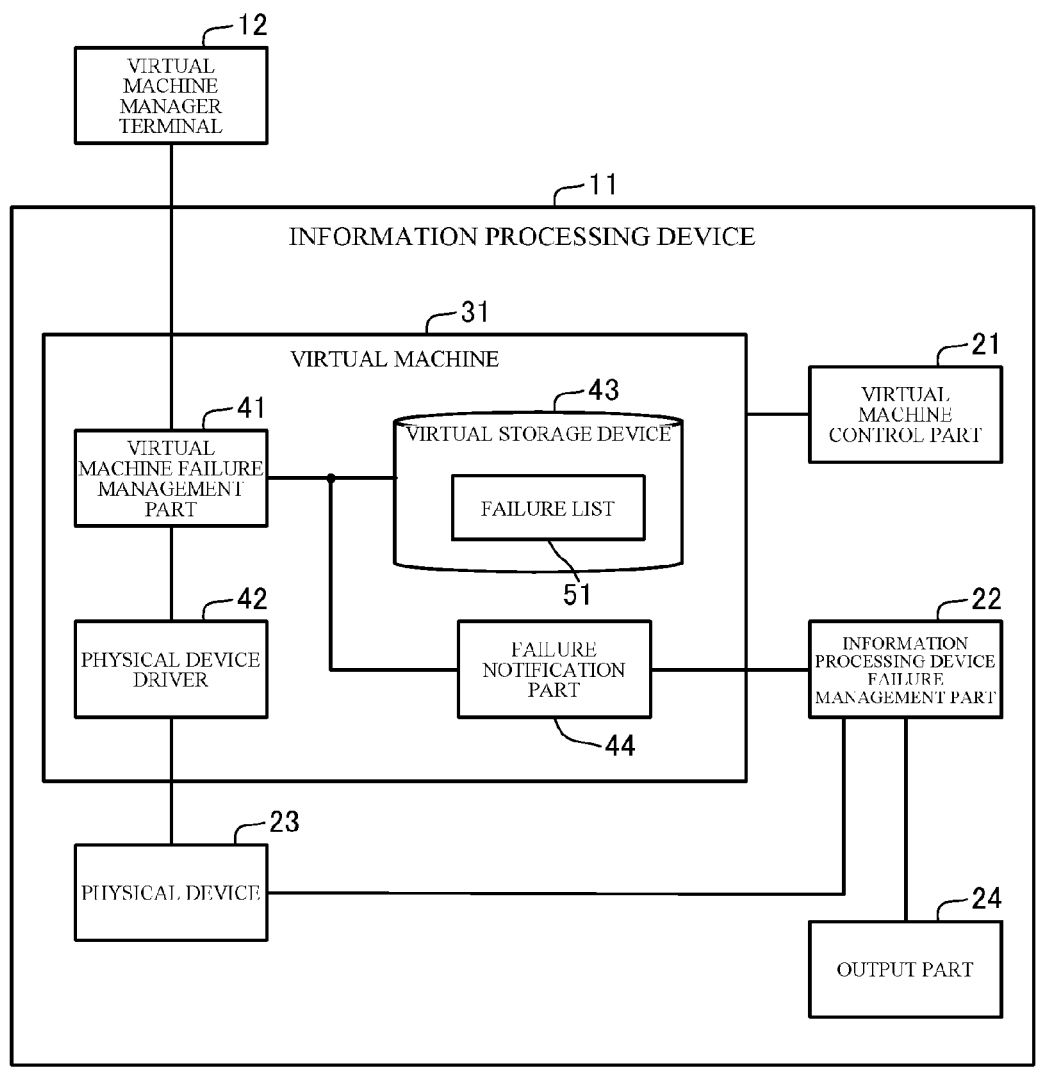

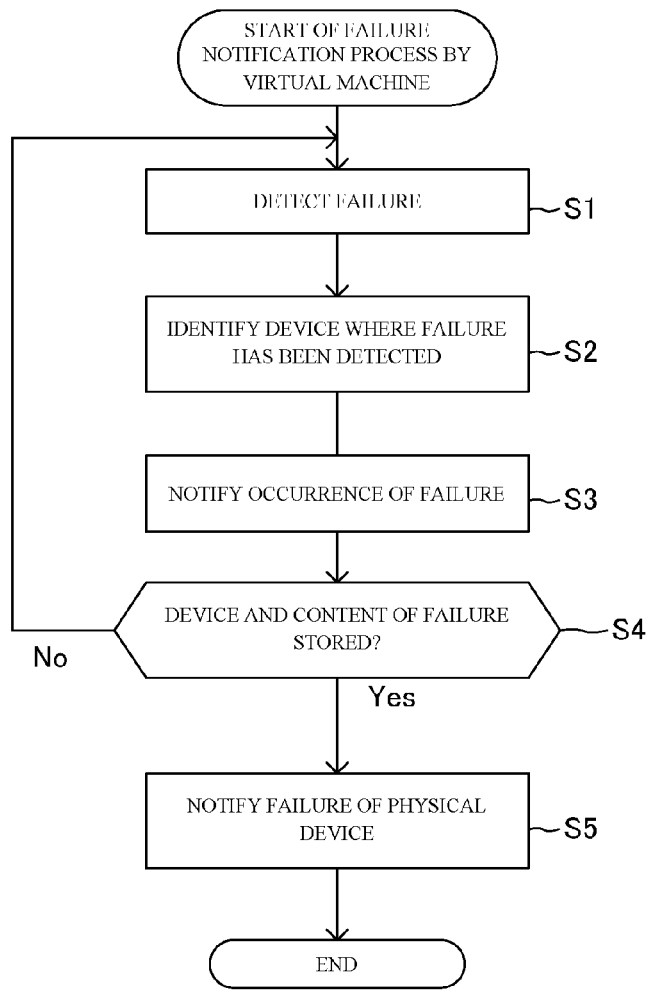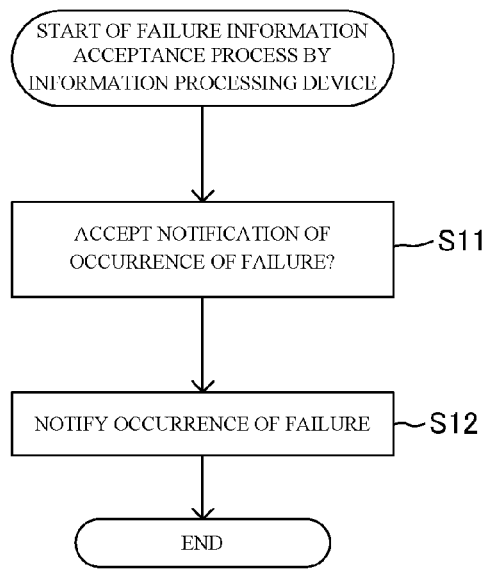

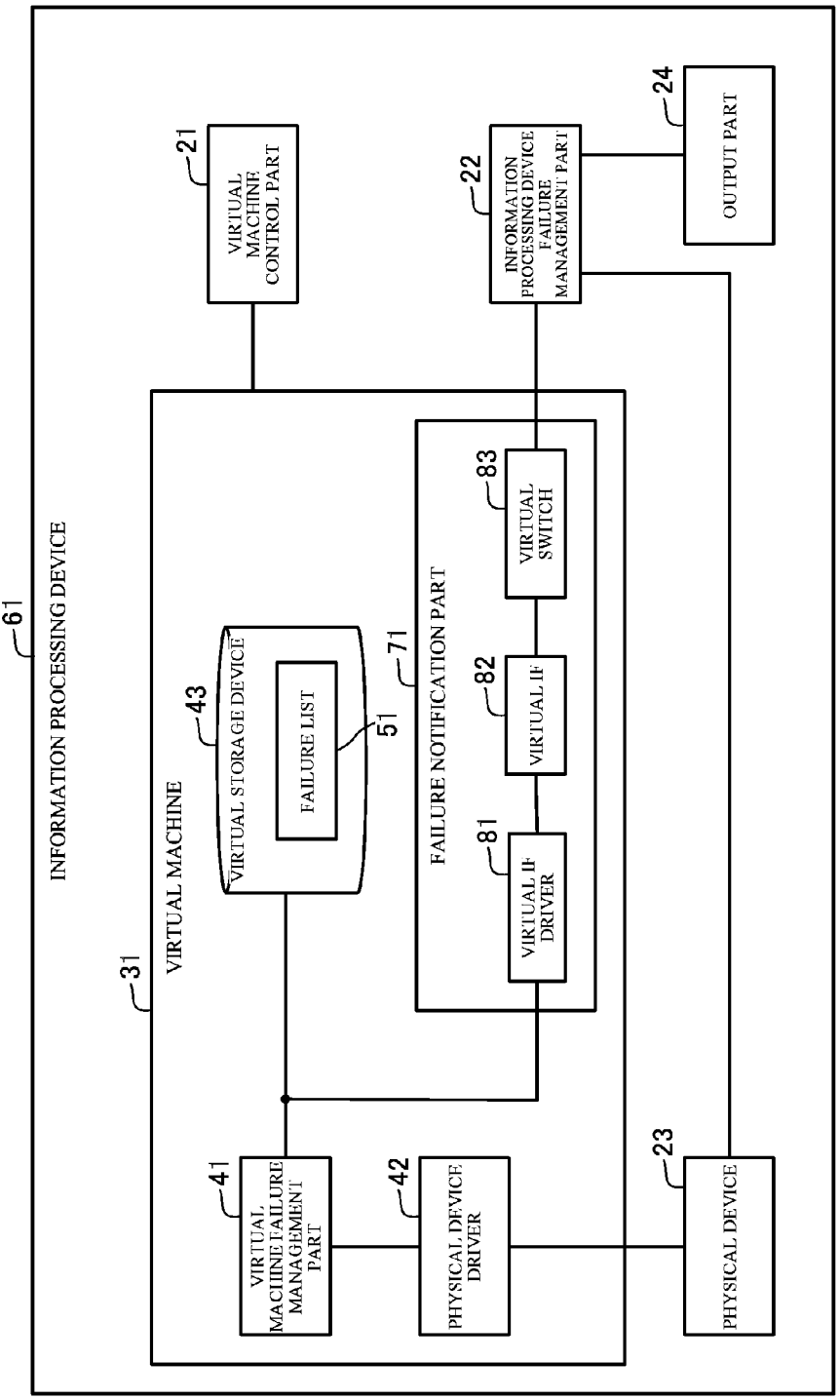

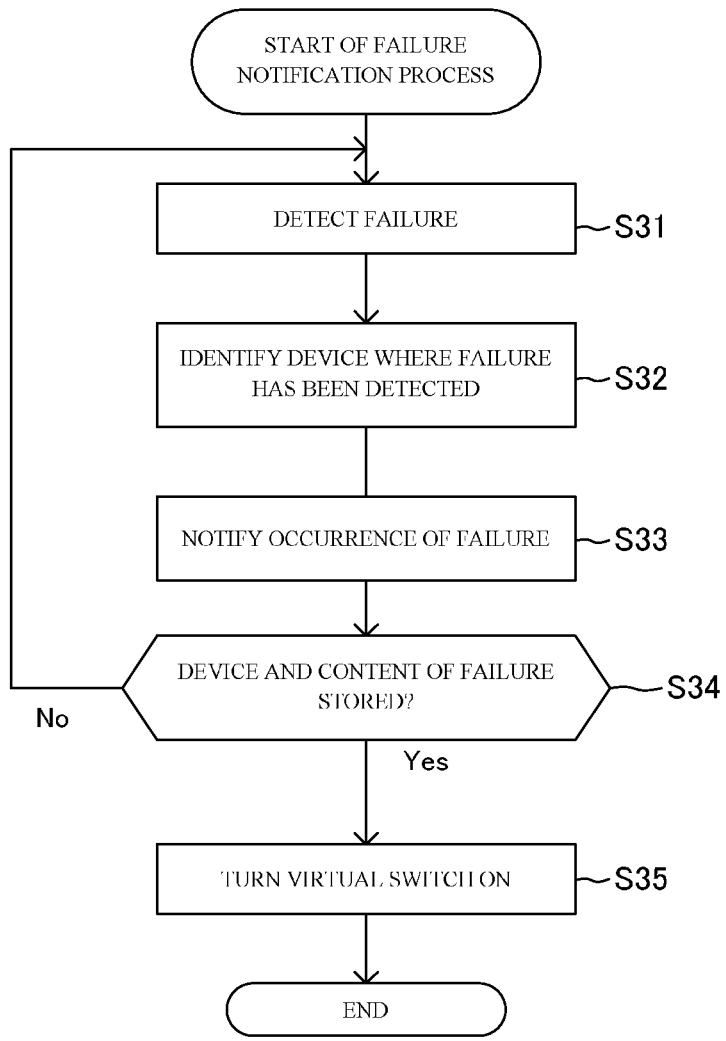

| KIND OF PHYSICAL DEVICE | CONTENT OF FAILURE |
|---|---|
| PHYSICAL DEVICE 23 | FAILURE A |
|  |  |
| ⋮ | ⋮ |

151a

B

| KINDS OF PHYSICAL DEVICE | CONTENT OF FAILURE |
|---|---|
| NULL | NULL |

151b

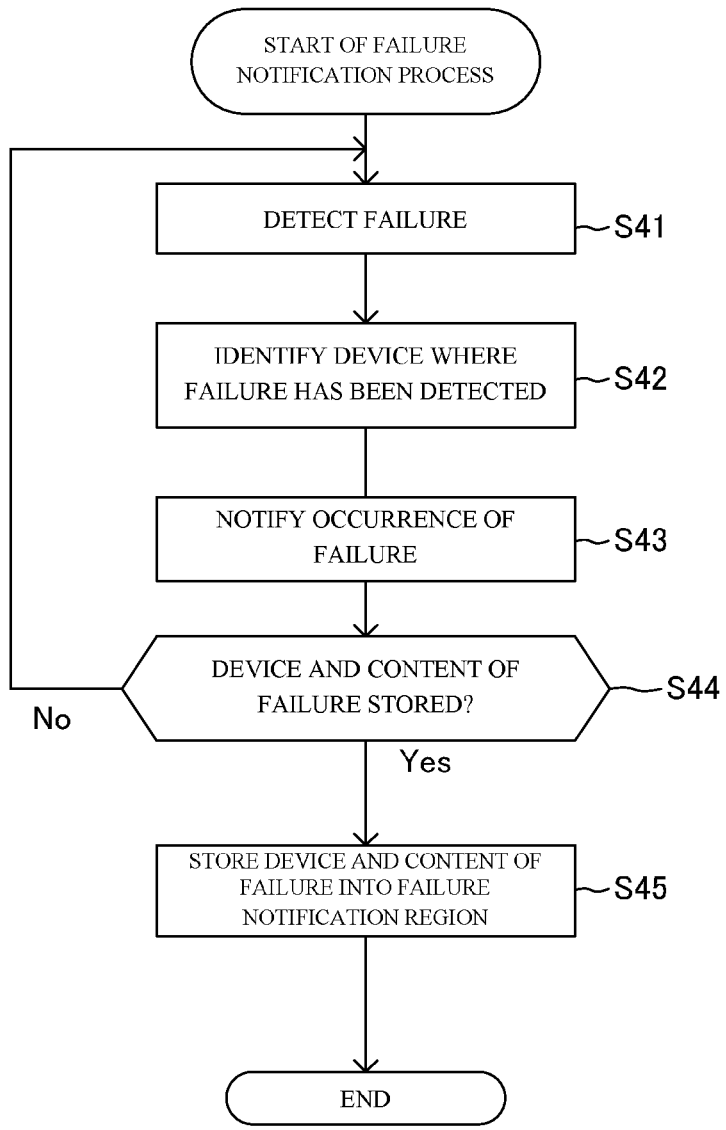

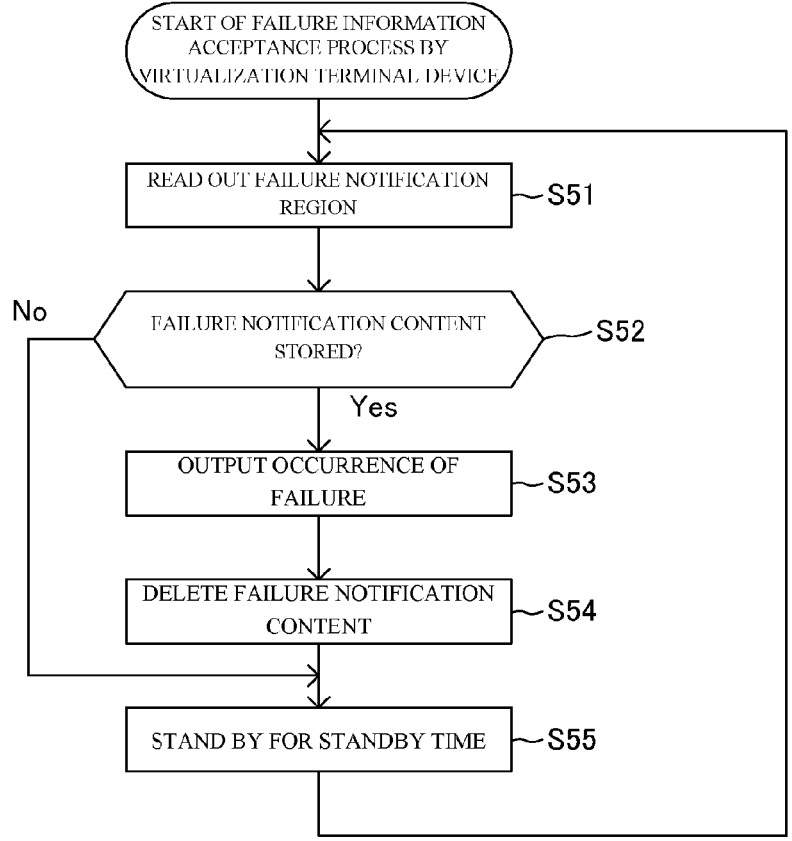
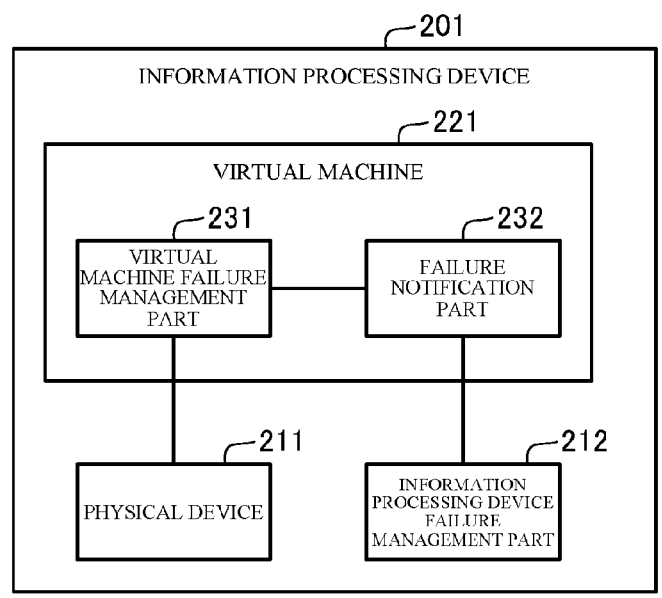

INFORMATION PROCESSING DEVICE

TECHNICAL FIELD

The present invention relates to an information processing device. In particular, the present invention relates to an information processing device which directly uses a physical device.

BACKGROUND ART

In general, a virtual machine uses a virtual device, such as a virtual network interface and a virtual external storage device, emulated by a virtualization device which starts the virtual machine. Now it is known that an influence of virtual device emulation markedly decreases the throughput performance of a virtual machine and the performance in I/O (Input/Output) with an external storage device. Therefore, when it is desired to realize high-speed communication and high-speed disk I/O performance, there is a case where a virtual machine does not use a virtual device but directly uses a physical device included by a virtualization device (see Patent Document 1, for example).

A cloud service such as IaaS (Infrastructure as a Service) is configured in a form that a cloud service provider provides a user with a virtualization device and a network and the user starts any virtual machine and develops their own service.

Further, carrier cloud migration that realizes a communication service provided by a telecom carrier in a cloud infrastructure has been evolved in recent years. For example, carrier cloud migration of EPC (Evolved Packet Core) that is standardized in 3GPP (Third Generation Partnership Project) and forms a core network has been examined. EPC is equipped with MME (Mobility Management Entity), S-GW (Serving Gateway), and P-GW (Packet data network Gateway). In particular, P-GW needs to process a communication packet of a user terminal at high speeds because functioning as a gateway for connecting to the outside, for example, to the Internet. Thus, for making a virtual machine of the P-GW function run on a virtualization device, the virtual machine needs to directly use a physical network interface (a physical device), for example, by using a PCI (Peripheral Component Interconnect) passthrough function.

Furthermore, a telecom carrier having implemented a carrier cloud infrastructure becomes capable of providing a mobile virtual network operator (MVNO) with their own carrier cloud infrastructure. In this case, the MVNO makes a virtual machine having an original function equivalent to P-GW run on the carrier cloud infrastructure. Then, the MVNO needs to make their own virtual machine directly use a physical network interface of a virtualization device.
Patent Document 1: Japanese Unexamined Patent Application Publication No. JP-A 2012-198651

However, when a failure occurs in the abovementioned physical device, only a virtual machine manager (for example, the MVNO) can detect the failure, and a virtualization device manager (for example, the telecom carrier) cannot detect the failure. To be specific, when a virtual machine directly uses a physical device, a virtualization device cannot use the physical device, with the result that there is a problem that the virtual machine can detect a failure occurring in the physical device and the virtualization device (an information processing device) cannot detect the failure occurring in the physical device.

SUMMARY

Accordingly, an object of the present invention is to provide a virtualization system capable of solving the abovementioned problem that an information processing device cannot detect a failure occurring in a physical device.

In order to achieve the object, an information processing device as an aspect of the present invention includes:
a virtual machine built in the information processing device and able to use a physical device included by the information processing device; and
an information processing device failure managing means for detecting a failure in the information processing device,
The virtual machine includes:
a virtual machine failure managing means for detecting a failure in the physical device which the virtual machine can use; and
a failure notifying means for notifying occurrence of a failure in the physical device to the information processing device failure managing means, the failure having been detected by the virtual machine failure managing means.

Further, in a method for information processing by a virtualization system as another aspect of the present invention, a virtual machine built in an information processing device and able to use a physical device included by the information processing device performs operations including:
detecting a failure in the physical device which the virtual machine can use; and
notifying occurrence of a failure detected in the physical device to an information processing device failure management part which detects a failure in the information processing device.

Further, a program as still another aspect of the present invention is a computer program including instructions for causing an information processing device to realize:
a virtual machine built in the information processing device and able to use a physical device included by the information processing device; and
an information processing device failure managing means for detecting a failure in the information processing device.
The computer program also includes instructions for causing the virtual machine to realize:
a virtual machine failure managing means for detecting a failure in the physical device which the virtual machine can use; and
a failure notifying means for notifying occurrence of a failure in the physical device to the information processing device failure managing means, the failure having been detected by the virtual machine failure managing means.

With the configurations as described above, the present invention enables an information processing device to detect a failure occurring in a physical device even when a virtual machine is using the physical device.

BRIEF DESCRIPTION OF DRAWINGS

FIG. 1 is a block diagram showing the configuration of an information processing system according to a first exemplary embodiment of the present invention;
FIG. 2 is a block diagram showing an example of a failure list;
FIG. 3 is a flowchart for describing a failure notification process;
FIG. 4 is a flowchart for describing a failure information acceptance process;
FIG. 5 is a block diagram showing the configuration of an information processing device according to a second exemplary embodiment of the present invention;
FIG. 6 is a flowchart for describing a failure notification process;

FIG. 8 is a block diagram showing an example of a failure notification region;

FIG. 9 is a flowchart for describing a failure notification process;

FIG. 10 is a flowchart for describing a failure information acceptance process; and FIG. 11 is a block diagram showing the configuration of an information processing device according to a fourth exemplary embodiment of the present invention.

EXEMPLARY EMBODIMENTS

First Exemplary Embodiment

Figure 7:
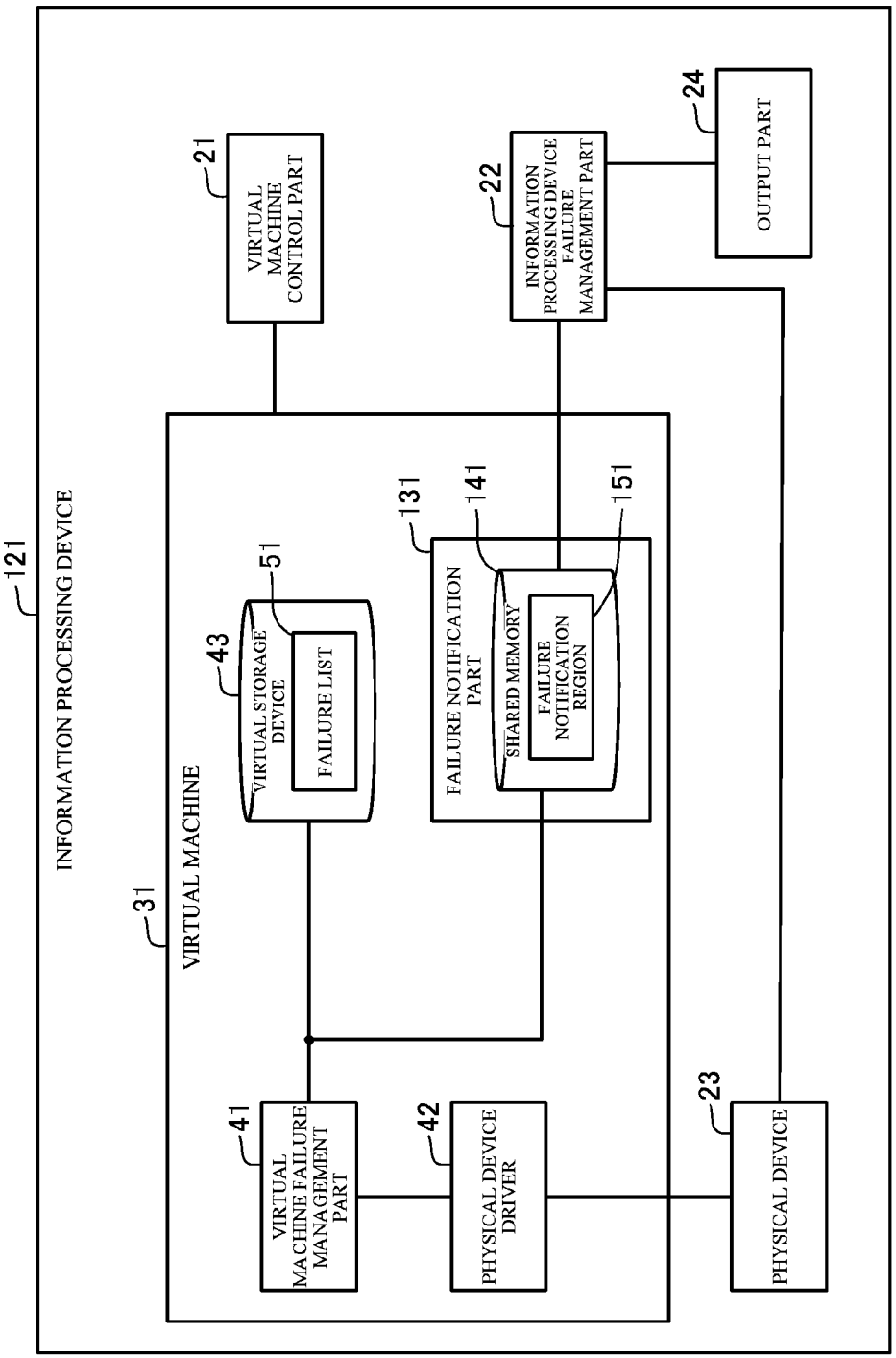
FIG. 7 is a block diagram showing the configuration of an information processing device according to a third exemplary embodiment of the present invention.

Referring to FIGS. 1 to 4, a first exemplary embodiment of the present invention will be described below. FIGS. 1 and 2 are diagrams for describing the configuration of an information processing system in the first exemplary embodiment. FIGS. 3 and 4 are diagrams for describing the operation of the information processing system.
(Configuration)

FIG. 1 is a diagram showing the overview of an information processing system 1. The information processing system shown in FIG. 1 includes an information processing device 11 and a virtual machine manager terminal 12. The information processing device 11 provides a service which makes a virtual machine run (for example, a cloud service) to a virtual machine manager that operates the virtual machine manager terminal 12. The manager of the information processing device 11 providing a service making a virtual machine run is, for example, a carrier that provides a cloud service. The virtual machine manager is, for example, a user of a cloud service.

First, the configuration of the information processing device 11 will be described. The information processing device 11 shown in FIG. 1 includes a virtual machine control part 21, an information processing device failure management part 22 (an information processing device failure managing means), a physical device 23, and an output part 24. Moreover, the information processing device 11 has a virtualization function of making the virtual machine control part 21 start a virtual machine 31, and a function of making the virtual machine 31 directly use the physical device 23. The information processing device 11 is, for example, a server device which has a Linux™ KVM (Kernel-based Virtual Machine) and a PCI (Peripheral Component Interconnect) passthrough function.

The information processing device failure management part 22 detects a failure in the information processing device 11, and notifies failure occurrence to the manager of the information processing device 11 via the output part 24. For example, the information processing device failure management part 22 transmits a TRAP message (a message which notifies occurrence of an abnormality) using SNMP (Simple Network Management Protocol), as notification of failure occurrence.

Herein, the information processing device failure management part 22 shall be incapable of detecting a failure of a device which is being directly used by the virtual machine 31 (for example, the physical device 23). Therefore, the information processing device failure management part 22 receives notification of occurrence of a failure transmitted from a failure notification part 44 of the virtual machine 31 to be described later, and deals with the failure based on the notification as a failure detected by the information processing device 11.

The physical device 23 is a device included by the information processing device 11. The physical device 23 is, for example, a NIC (Network Interface Card), a graphics card, and a storage device. The physical device 23 has a function which can be directly used by the virtual machine 31. Herein, the information processing device 11 does not need to include only one physical device 23 necessarily, and may include a plurality of physical devices 23.

The virtual machine control part 21 starts and controls the virtual machine 31. Herein, the virtual machine control part 21 does not need to start only one virtual machine 31 necessarily, and may start two or more virtual machines 31. This virtual machine 31 is built in the information processing device, and has a function of enabling use of a physical device included by the information processing device. The virtual machine 31 includes a virtual machine failure management part 41 (a virtual machine failure managing means), a physical device driver 42, a virtual storage device 43 (a list storing means) and a failure notification part 44 (a failure notifying means) as shown in FIG. 1.

The physical device driver 42 is software for controlling the physical device 23 included by the information processing device 11, for example. The physical device driver 42 notifies the operation state of the physical device 23 to the virtual machine failure management part 41.

The virtual machine failure management part 41 detects a failure occurring in the virtual machine 31, and identifies a device (for example, the kind of a device) where the failure has been detected. For example, in a case where a failure occurs in the physical device 23, the physical device driver 42 notifies the failure (for example, an error code) as the operation state of the physical device 23 to the virtual machine failure management part 41. Then, the virtual machine failure management part 41 detects the failure by accepting the failure notification from the physical device driver 42, and identifies the physical device 23 as the device where the failure has been detected. Moreover, the virtual machine failure management part 41 detects (identifies) failure content information representing the content of the failure of the device where the failure has been detected, on the basis of the failure notification accepted from the physical device driver 42.

Then, after detecting the failure, the virtual machine failure management part 41 notifies failure occurrence to the virtual machine manager terminal part 12. For example, notification of failure occurrence contains information of a device where a failure has been detected by the virtual machine failure management part 41, failure content information of the device, and so on. Thus, the manager of a virtual machine can recognize occurrence of a failure in (a given device in) the virtual machine.

Subsequently, the virtual machine failure management part 41 determines whether or not the information processing device failure management part 22 can detect the detected device failure. To be specific, referring to a failure list 51 (a failure detection target list) stored in the virtual storage device 43, the virtual machine failure management part 41 determines whether or not the device where the failure has been detected and the content of the failure (for example, physical device information corresponding to the physical device where the failure has been detected) are stored. Now the virtual storage device 43 will be described.

The virtual storage device 43 is a virtual storage device which runs in a virtual machine. The virtual storage device 43 is configured in a region on a storage device (not shown in the drawings) in the information processing device 11. For example, the virtual storage device 43 is a virtual image file of the qcow2 format, or the like. The virtual storage device 43 stores the failure list 51.

The failure list 51 is a list which describes information for identifying the physical device 23 which the information processing device failure management part 22 cannot detect a failure from while the virtual machine 31 is using and failure content information (physical device information) of the physical device 23, among failures occurring in the virtual machine 31. For example, as shown in FIG. 2, the failure list 51 stores "physical device 23," which is the kind of a physical device, and "failure A," which is the content of a failure represented by failure content information. In other words, the failure A of the physical device 23 represents a failure which the information processing device failure management part 22 cannot detect while the virtual machine 31 is using the physical device 23. The failure list 51 may store only information for identifying a physical device (for example, identification information and kind information of a physical device).

Then, in the case of determining that the device where the failure has been detected and the failure content information are stored as a result of referring to the failure list 51 stored in the virtual storage device 43, the virtual machine failure management part 41 notifies occurrence of a failure in the physical device to the failure notification part 44. For example, the virtual machine failure management part 41 outputs, as notification of failure occurrence, information for identifying a physical device and failure content information of the physical device. On accepting the notification of failure occurrence in the physical device from the virtual machine failure management part 41, the failure notification part 44 notifies the failure of the physical device to the information processing device failure management part 22. In other words, the failure notification part 44 outputs the accepted failure occurrence notification to the information processing device failure management part 22. Thus, for example, the information processing device failure management part 22 can indirectly detect occurrence of a failure in the physical device 23 which is being used by the virtual machine 31.

By accepting notification of a failure in a physical device from the failure notification part 44, the information processing device failure management part 22 can deal with the failure notified from the failure notification part 44 as a failure detected in the information processing device 11. Then, the information processing device failure management part 22 notifies failure occurrence to the manager of the information processing device 11 via the output part 24.

Accordingly, for example, even when the information processing device failure management part 22 cannot directly detect occurrence of a failure in the physical device 23 because the virtual machine 31 is using the physical device 23, the information processing device failure management part 22 can indirectly detect occurrence of a failure in the physical device 23 via the virtual machine failure management part 41 and the failure notification part 44.

(Operation)

Next, referring to FIGS. 3 and 4, the operation of the information processing system will be described. FIG. 3 is a flowchart for describing a failure notification process by the virtual machine 31. FIG. 4 is a flowchart for describing a failure information acceptance process by the information processing device 11.

In the failure notification process shown in FIG. 3, firstly, the virtual machine failure management part 41 detects a failure in the virtual machine 31 (step S1). Then, the virtual machine failure management part 41 identifies a device where the failure has been detected (step S2). For example, when a failure has occurred in the physical device 23, the physical device driver 42 notifies the failure (for example, an error code) as the operation state of the physical device 23 to the virtual machine failure management part 41. Subsequently, the virtual machine failure management part 41 detects the failure by accepting the failure notification from the physical device driver 42, and identifies the device where the failure has been detected as the physical device 23. Moreover, the virtual machine failure management part 41 can detect failure content information of the device where the failure has been detected (for example, the physical device 23).

Subsequently, the virtual machine failure management part 41 notifies failure occurrence to the manager of the virtual machine (step S3). Thus, the manager of the virtual machine can recognize occurrence of the failure in the virtual machine.

Next, referring to the failure list 51 stored in the virtual storage device 43, the virtual machine failure management part 41 determines whether or not the device where the failure has been detected and the content of the failure are stored (step S4). The failure list 51 is a list which describes the content of a physical device failure which cannot be detected by the information processing device failure management part 22 among failures occurring in the virtual machine 31. For example, as shown in FIG. 2, the failure list 51 stores "physical device 23," which is the kind of a physical device, and "failure A," which is the content of a failure. In other words, the failure A of the physical device 23 represents that the information processing device failure management part 22 cannot detect a failure when the virtual machine 31 is using the physical device 23. The failure list 51 may store only the kind of a physical device.

In the case of determining that at least one of the device where the failure has been detected and the content of the failure is not stored (step S4: NO), the process returns to step S1, and the processing thereafter is repeated. For example, when a device where the failure has occurred is a virtual device, or when a physical device failure can be detected by the information processing device failure management part 22 while the physical device is being used by a virtual machine, the virtual machine failure management part 41 determines NO in the processing at step S4.

On the other hand, in the case of determining that the device where the failure has been detected and the content of the failure are stored (step S4: YES), the failure notification part 44 notifies the physical device failure detected in the processing at steps S1 and S2 to the information processing device failure management part 22 (step S5). For example, the virtual machine failure management part 41 outputs, as notification of failure occurrence, information for identifying a physical device and failure content information of the physical device. Then, the failure notification part 44 outputs the notification of failure occurrence outputted from the virtual machine failure management part 41 to the information processing device failure management part 22. After the processing at step S5, the failure notification process by the virtual machine 31 shown in FIG. 3 ends.

Subsequently, at step S11 in FIG. 4, the information processing device failure management part 22 of the information processing device 11 accepts the failure notification outputted in the processing at step S5 in FIG. 3 (step S11).

Consequently, it is possible to deal with the failure notified from the failure notification part 44 as a failure detected by the information processing device 11.

Then, the information processing device failure management part 22 notifies (outputs) failure occurrence via the output part 24 (step S12). After the processing at step S12, the failure information acceptance process by the information processing device 11 ends. Thus, for example, even when being unable to directly detect occurrence of a failure in the physical device 23 because the virtual machine 31 is using the physical device 23, the information processing device failure management part 22 can indirectly detect occurrence of a failure in the physical device 23 via the virtual machine failure management part 41 and the failure notification part 44. As a result, the information processing device 11 can notify occurrence of a failure to the manager of the information processing device 11.

Second Exemplary Embodiment

Next, an information processing device according to another exemplary embodiment of the present invention will be described referring to FIGS. 5 and 6. In the second exemplary embodiment, the same components as in the first exemplary embodiment will be denoted by the same reference numerals. Therefore, a difference from the information processing device 11 of the first exemplary embodiment, that is, the configuration of a failure notification part 71 of an information processing device 61 will be described.
(Configuration)

FIG. 5 is a block diagram showing the configuration of the information processing device 61. The information processing device 61 includes the failure notification part 71, instead of the failure notification part 44 shown in FIG. 1. The failure notification part 71 in FIG. 5 includes a virtual IF (Interface) driver 81, a virtual IF 82, and a virtual switch 83 (a connection controlling means). The failure notification part 71 builds a network which enables mutual communication between the virtual machine failure management part 41 and the information processing device failure management part 22. Then, the failure notification part 71 connects the virtual machine failure management part 41 and the information processing device failure management part 22, thereby enabling output of notification of failure occurrence from the virtual machine failure management part 41 to the information processing device failure management part 22.

The virtual IF driver 81 is a software module which controls the virtual IF 82. The virtual IF driver 81 is, for example, a device driver of a network interface emulated by the information processing device 61 (the virtual machine control part 21). The virtual IF 82 is a virtual network interface generated by the virtual machine control part 21. The virtual IF 82 is, for example, TAP in Linux KVM. For example, TAP has a function of providing a virtual NIC for Linux to communicate with a user process.

The virtual switch 83 is a virtual switch for enabling connection between the virtual IF 82 and the information processing device failure management part 22 and having them communicate. The virtual switch 83 is, for example, an OVS (Open vSwitch) or a Linux kernel bridge.

On accepting notification of failure occurrence from the virtual machine failure management part 41, the virtual IF driver 81 controls the virtual switch 83 via the virtual IF 82 to connect to the information processing device failure management part 22. For example, the virtual IF driver 81 switches the virtual switch 83 from OFF to ON via the virtual IF 82.

Consequently, the virtual machine failure management part 41 and the information processing device failure management part 22 are connected, and the information processing device failure management part 22 becomes capable of accepting failure notification (signal) representing detection of a failure outputted from the virtual machine failure management part 41. As a result, even when a plurality of virtual machines are built in the information processing device 61, each of the virtual machines can, with a simple configuration, securely notify occurrence of a failure in a physical device which is being used thereby to the information processing device failure management part 22. Moreover, because the virtual machine failure management part 41 and the information processing device failure management part 22 are connected only at the time of notification of a failure, it is possible to reduce energy consumption as compared with a case where connected at all times.
(Operation)

Next, referring to FIG. 6, another example of the failure notification process by the virtual machine 31 will be described. Herein, processing at steps S31 to S34 in FIG. 6 will be briefly described because it is the same as the processing at steps S1 to S4 in FIG. 3.

In the failure notification process shown in FIG. 6, firstly, the virtual machine failure management part 41 detects a failure in the virtual machine 31 (step S31), and identifies a device where the failure has been detected (step S32). Subsequently, the virtual machine failure management part 41 notifies failure occurrence to the virtual machine manager terminal 12 (step S33). Consequently, the manager of the virtual machine can recognize occurrence of the failure in the virtual machine.

Next, referring to the failure list 51 stored in the virtual storage device 43, the virtual machine failure management part 41 determines whether or not the device where the failure has been detected and the content of the failure are stored (step S34). In a case where the virtual machine failure management part 41 determines that at least one of the device where the failure has been detected and the content of the failure is not stored (step S34: NO), the process returns to step S31, and the processing thereafter is repeated.

On the other hand, in a case where the virtual machine failure management part 41 determines that both the device where the failure has been detected and the content of the failure are stored (step S34: YES), the failure notification part 71 turns the virtual switch on (step S35). To be more specific, the virtual IF driver 81 of the failure notification part 71 switches the virtual switch from OFF to ON via the virtual IF 82. Consequently, the virtual machine failure management part 41 and the information processing device failure management part 22 are connected, and the information processing device failure management part 22 becomes capable of accepting failure notification (signal) representing detection of a failure outputted from the virtual machine failure management part 41. After the processing at step S35, the failure notification process shown in FIG. 6 ends. As a result, even if a plurality of virtual machines are built in the information processing device 61, each of the virtual machines can, with a simple configuration, securely notify occurrence of a failure in a physical device which is being used thereby to the information processing device failure management part 22.

Third Exemplary Embodiment

Next, an information processing device according to another exemplary embodiment of the present invention will be described referring to FIGS. 7 to 10. In the third exemplary embodiment, the same components as in the first exemplary embodiment will be denoted by the same reference numerals. Therefore, a difference from the information processing device 11 in the first exemplary embodiment, that is, the configuration of a failure notification part 131 of an information processing device 121 will be described specifically.

(Configuration)

FIG. 7 is a block diagram showing the configuration of the information processing device 121. The information processing device 121 includes a failure notification part 131, instead of the failure notification part 44 in FIG. 1. The failure notification part 131 in FIG. 7 includes a shared memory 141. The shared memory 141 includes a failure notification region 151. The shared memory 141 may be either a volatile memory or a nonvolatile memory. The failure notification region 151 is a region secured on the shared memory 141, and has a configuration which enables the virtual machine failure management part 41 and the information processing device failure management part 22 to read from and write into, respectively. Referring to FIGS. 8A and 8B, the details of the failure notification region 151 will be described.

FIGS. 8A and 8B are diagrams showing examples of the failure notification region 151. On detecting a failure (for example, a failure A) in the physical device 23, the virtual machine failure management part 41 stores "failure A" of "physical device 23" as failure content information into a failure notification region 151a as shown in FIG. 8A, for example. Thus, by storing a device and the content of a failure into the failure notification region 151, the virtual machine failure management part 41 can indirectly notify the failure in the physical device 23 to the information processing device failure management part 22.

Then, the information processing device failure management part 22 reads out the failure notification region 151 at given timing (for example, at regular intervals), and determines whether or not failure content information is stored in the failure notification region 151. For example, in the case of reading out the failure notification region 151a shown in FIG. 8A, the information processing device failure management part 22 determines that failure content information is stored in the failure notification region 151. In this case, the information processing device failure management part 22 notifies failure occurrence to the manager of the information processing device 121 via the output part 24.

Then, the information processing device failure management part 22 accesses the failure notification region 151 of the shared memory 141, and deletes the failure content information stored in the failure notification region 151. For example, the information processing device failure management part 22 sets NULL as failure content information as shown in FIG. 8B. Next, the information processing device failure management part 22 stands by for a preset standby time and, after the standby time, reads out the failure notification region 151 again and repeats the processing described above.

In other words, firstly, the information processing device failure management part 22 determines whether or not failure content information is stored in the failure notification region 151. Then, in a case where NULL is set as failure content information in a failure notification region 151b as shown in FIG. 8B, the information processing device failure management part 22 determines that failure content information is not stored in the failure notification region 151b, and stands by for the abovementioned standby time.

Thus, the information processing device failure management part 22 in this exemplary embodiment can read out failure content information from the shared memory 141 at given timing. Therefore, for example, even when the virtual machine 31 detects failures in a plurality of physical devices 23 at one time, the information processing device failure management part 22 will not be overloaded and can securely read out information of the failures in the physical devices 23.

When failure content information is stored into the failure notification region 151 by the virtual machine failure management part 41, the failure notification part 131 may notify occurrence of a failure in the physical device 23 to the information processing device failure management part 22. Then, the information processing device failure management part 22 having accepted the notification from the failure notification part 131 can read out the failure notification region 151, notify failure occurrence to the manager of the information processing device 11 via the output part 24, and delete the failure content information stored in the failure notification region 151.

(Operation)

Next, referring to FIGS. 9 and 10, another example of the operation of the information processing system will be described. Processing at steps S41 to S44 will be briefly described because it is the same as the processing at steps S1 to S4 in FIG. 3.

In the failure notification process shown in FIG. 9, firstly, the virtual machine failure management part 41 detects a failure in the virtual machine 31 (step S41), and identifies a device where the failure has been detected (step S42). Subsequently, the virtual machine failure management part 41 notifies failure occurrence to the virtual machine manager terminal 12 (step S43). Consequently, the manager of the virtual machine can recognize occurrence of a failure in the virtual machine.

Next, referring to the failure list 51 stored in the virtual storage device 43, the virtual machine failure management part 41 determines whether or not the device where the failure has been detected and the content of the failure are stored (step S44). In a case where the virtual machine failure management part 41 determines that at least one of the device where the failure has been detected and the content of the failure is not stored (step S44: NO), the process returns to step S41, and the processing thereafter is repeated.

On the other hand, in the case of determining that both the device where the failure has been detected and the content of the failure are stored (step S44: YES), the virtual machine failure management part 41 stores the device and the content of the failure as failure content information into the failure notification region 151 of the shared memory 141 of the failure notification part 131 (step S45). For example, as shown in FIG. 8A, the virtual machine failure management part 41 stores "failure A" of "physical device 23" into the failure notification region 151a. Thus, by storing a device and the content of a failure into the failure notification region 151, the virtual machine failure management part 41 can indirectly notify a failure of the physical device 23 to the information processing device failure management part 22

Subsequently, at step S51 in FIG. 10, the information processing device failure management part 22 reads out the failure notification region 151 from the shared memory 141. Then, the information processing device failure management part 22 determines whether or not failure content information is stored in the failure notification region 151 (step S52). In this case, because failure content information has been stored in the processing at step S45 in FIG. 9 described above, the information processing device failure management part 22 determines YES in processing at step S52.

Subsequently, the information processing device failure management part 22 outputs (notifies) failure occurrence to the manager of the information processing device 11 via the output part 24 (step S53). Then, the information processing device failure management part 22 accesses the failure notification region 151 of the shared memory 141, and deletes the failure content information stored in the failure notification region 151 (step S54). For example, the information processing device failure management part 22 sets NULL as failure content information as shown in FIG. 8B (the failure notification region 151*b*).

Next, the information processing device failure management part 22 stands by for a preset standby time (step S55) and, after the standby time, repeats the processing at step S51 and thereafter. For example, the information processing device failure management part 22 reads out the failure notification region 151 again (step S51), and determines whether or not failure content information is stored (step S52). Herein, assuming the failure content information has been deleted in the processing at step S54 (for example, FIG. 8B), the information processing device failure management part 22 determines NO in the processing at step S52. Then, the information processing device failure management part 22 omits the processing at steps S53 and S54 described above, and executes the processing at step S55.

Consequently, the information processing device failure management part 22 can read out information of a failure from the shared memory at given timing. Therefore, for example, even if the virtual machine detects failures of a plurality of physical devices at one time, the information processing device failure management part 22 will not be overloaded, and the information processing device failure management part 22 can securely read out information of the failure in the physical devices.

Fourth Exemplary Embodiment

Next, an information processing device 201 according to a fourth exemplary embodiment of the present invention will be described referring to FIG. 11.

The information processing device 201 according to the fourth exemplary embodiment includes:

a virtual machine 221 built in the information processing device 201 and able to use a physical device 211 included by the information processing device 201; and an information processing device failure management part 212 (an information processing device failure managing means) detecting a failure in the information processing device 201, wherein the virtual machine 221 includes:

a virtual machine failure management part 231 (a virtual machine failure managing means) detecting a failure in the physical device 211 which the virtual machine 221 can use; and a failure notification part 232 (a failure notifying means) notifying occurrence of a failure in the physical device to the information processing device failure management part 212, the failure having been detected by the virtual machine failure management part 231.

According to the configuration described above, when the virtual machine failure management part 231 detects a failure in the physical device 211 which is being used by the virtual machine 221, the failure notification part 232 notifies failure occurrence in the physical device 211 to the information processing device failure management part 212. As a result, the information processing device 201 can detect the failure occurrence in the physical device 211 even when the virtual machine 221 is using the physical device 211.

Although the present invention has been described above referring to the exemplary embodiments, the present invention is not limited to the exemplary embodiments. The configurations and details of the present invention can be changed and modified in various manners that can be understood by one skilled in the art within the scope of the present invention.

<Supplementary Notes>

The whole or part of the exemplary embodiments disclosed above can be described as, but not limited to, the following supplementary notes.

(Supplementary Note 1)

An information processing device comprising:

a virtual machine built in the information processing device and able to use a physical device included by the information processing device; and an information processing device failure managing means for detecting a failure in the information processing device, wherein the virtual machine includes:

a virtual machine failure managing means for detecting a failure in the physical device which the virtual machine can use; and a failure notifying means for notifying occurrence of a failure in the physical device to the information processing device failure managing means, the failure having been detected by the virtual machine failure managing means.

According to the configuration, in a case where the virtual machine failure managing means detects a failure in the physical device which is being used by the virtual machine, the failure notifying means notifies failure occurrence in the physical device to the information processing device failure managing means. As a result, the information processing device can detect occurrence of a failure in the physical device even if the virtual machine is using the physical device.

The information processing device according to Supplementary Note 1, comprising a list storing means for storing physical device information into a failure detection target list, the physical device information including information for identifying the physical device, wherein in a case where the physical device information corresponding to the physical device which the virtual machine failure managing means has detected a failure from is stored in the failure detection target list, the failure notifying means notifies failure occurrence in the physical device.

According to the configuration, in a case where the physical device where a failure has been detected is included in the physical device information stored in the failure detection target list, failure occurrence is notified to the information processing device failure managing means. Therefore, it is possible to notify only failure occurrence in the physical device necessary for the information processing device failure managing means.

The information processing device according to Supplementary Note 2, wherein the list storing means stores, as the physical device information, information for identifying the physical device which the virtual machine is using and which the information processing device failure managing means cannot detect a failure from.

According to the configuration, information of the physical device which the information processing device failure managing means cannot detect a failure from while the virtual machine is using is stored in the failure detection target list. Therefore, by referring to the physical device information stored in the failure detection target list, it is possible to securely notify failure occurrence in the physical device which cannot be detected by the information processing device failure managing means.

The information processing device according to Supplementary Note 2 or 3, wherein:

the list storing means stores the physical device information including failure content information showing a content of a failure in the physical device;

the virtual machine failure managing means identifies the physical device where a failure has occurred and failure content information of the physical device; and in a case where the physical device and the failure content information identified by the virtual machine failure managing means are stored in the failure detection target list, the failure notifying means notifies failure occurrence in the physical device.

According to the configuration, the list storing means stores the failure content information of the physical device into the failure detection target list and, by referring to the physical device information (the physical device and the content of a failure) stored in the failure detection target list, the virtual machine failure managing means can output notification of failure occurrence appropriate for the kind of a failure in the physical device used by the virtual machine to the information processing device failure managing means.

The information processing device according to any of Supplementary Notes 1 to 4, wherein:

the failure notifying means has a connection controlling means for controlling connection between the virtual machine failure managing means and the information processing device failure managing means; and when the virtual machine failure managing means detects a failure in the physical device, the connection controlling means connects the virtual machine failure managing means and the information processing device failure managing means.

According to the configuration, for example, in output of notification of failure occurrence from the virtual machine failure managing means to the information processing device failure managing means, the failure notifying means connects the virtual machine failure managing means and the information processing device failure managing means. Therefore, it is possible with a simple configuration to securely notify occurrence of a failure in the physical device which is being used by the virtual machine.

The information processing device according to any of Supplementary Notes 1 to 5, wherein:

the failure notifying means has a shared memory which the virtual machine failure managing means and the information processing device failure managing means can read from and write into, respectively; and the virtual machine failure managing means stores, into the shared memory, the physical device information including information for identifying the physical device where a failure has been detected.

According to the configuration, because information of a detected failure is written into the shared memory, the information processing device failure managing means can read out information of the failure from the shared memory at given timing. As a result, for example, even when the virtual machine detects failures of many physical devices at one time, the information processing device failure managing means will not be overloaded, the information processing device failure managing means can securely read out information of a failure in the physical device.

An information processing method, wherein a virtual machine built in an information processing device and able to use a physical device included by the information processing device performs operations including:

detecting a failure in the physical device which the virtual machine can use; and notifying occurrence of a failure detected in the physical device to an information processing device failure management part which detects a failure in the information processing device.

The information processing method according to Supplementary Note 7, comprising:

storing physical device information into a failure detection target list, the physical device information including information for identifying the physical device; and in a case where the physical device information corresponding to the physical device where a failure has been detected is stored in the failure detection target list, notifying failure occurrence in the physical device.

A computer program comprising instructions for causing an information processing device to realize:

a virtual machine built in the information processing device and able to use a physical device included by the information processing device; and an information processing device failure managing means for detecting a failure in the information processing device, the computer program also comprising instructions for causing the virtual machine to realize:

a virtual machine failure managing means for detecting a failure in the physical device which the virtual machine can use; and a failure notifying means for notifying occurrence of a failure in the physical device to the information processing device failure managing means, the failure having been detected by the virtual machine failure managing means.

The computer program according to Supplementary Note 9, comprising instructions for causing the information processing device to realize a list storing means for storing physical device information into a failure detection target list, the physical device information including information for identifying the physical device, the computer program also comprising instructions for, in a case where the physical device information corresponding to the physical device which the virtual machine failure managing means has detected a failure from is stored in the failure detection target list, causing the failure notifying means to notify failure occurrence in the physical device.

The program described in the respective exemplary embodiments and supplementary notes is stored in a storage device or recorded on a computer-readable medium. For example, the recording medium is a portable medium such as a flexible disk, an optical disk, a magneto-optical disk and a semiconductor memory.

Although the present invention has been described above referring to the exemplary embodiments, the present invention is not limited to the exemplary embodiments. The configurations and details of the present invention can be changed and modified in various manners that can be understood by one skilled in the art within the scope of the present invention.

The present invention is based upon and claims the benefit of priority from Japanese patent application No. 2013-

053946, filed on Mar. 15, 2013, the disclosure of which is incorporated herein in its entirety by reference.

DESCRIPTION OF REFERENCE NUMERALS 1 information processing system
11 information processing device
12 virtual machine manager terminal
21 virtual machine control part
22 information processing device failure management part
23 physical device
24 output part
31 virtual machine
41 virtual machine failure management part
42 physical device driver
43 virtual storage device
44 failure notification part
61 information processing device
71 failure notification part
81 driver
82 virtual IF
83 virtual switch
121 information processing device
131 failure notification part
141 shared memory
201 information processing device
211 physical device
212 information processing device failure management part
221 virtual machine
231 virtual machine failure management part
232 failure notifying part

The invention claimed is:

1. An information processing device, comprising:
a physical device;
a virtual machine built in the information processing device and able to use the physical device; and
an information processing device failure managing unit, external to the virtual machine, configured to detect failures in the information processing device,
wherein the virtual machine includes:
a virtual machine failure managing unit that detects a failure in the physical device used by the virtual machine, and
a failure notifying unit that notifies the information processing device failure managing unit of occurrence of the failure, where said failure is non-detectable by the information processing device failure managing unit during use of the physical device by the virtual machine.

2. The information processing device according to claim 1, further comprising:
a list storing unit that stores physical device information into a failure detection target list, the physical device information including information for identifying the physical device,
wherein the failure notifying unit notifies the information processing device failure managing unit of occurrence of the failure when the failure detected during use of the physical device by the virtual machine matches an information stored in the failure detection target list.

3. The information processing device according to claim 2, wherein the list storing unit stores, as the physical device information, information for identifying the physical device that the virtual machine is using, and for which the information processing device failure managing unit cannot detect failure.

4. The information processing device according to claim 2, wherein:
the list storing unit stores the physical device information including failure content information showing a content of the failure in the physical device,
the virtual machine failure managing unit identifies the physical device where the failure has occurred and the failure content information of the physical device, and
the failure notifying unit notifies failure occurrence in the physical device in a case where the physical device and the failure content information identified by the virtual machine failure managing unit are stored in the failure detection target list.

5. The information processing device according to claim 1, wherein:
the failure notifying unit has a connection controlling unit that controls a connection between the virtual machine failure managing unit and the information processing device failure managing unit, and
when the virtual machine failure managing unit detects the failure in the physical device, the connection controlling unit connects the virtual machine failure managing unit and the information processing device failure managing unit.

6. The information processing device according to claim 1, wherein:
the failure notifying unit has a shared memory which the virtual machine failure managing unit and the information processing device failure managing unit can read from and write into, respectively, and
the virtual machine failure managing unit stores, into the shared memory, the physical device information including information for identifying the physical device where the failure has been detected.

7. An information processing method, wherein a virtual machine built in an information processing device and able to use a physical device in communication with the information processing device, the method comprising:
detecting, by said virtual machine and during use of the physical device by the virtual machine, a failure in the physical device; and
notifying, by said virtual machine, occurrence of the failure to an information processing device failure management part external to the virtual machine, where said failure is one that the information processing device failure management part cannot detect during use of the physical device by the virtual machine.

8. The information processing method according to claim 7, comprising:
storing physical device information into a failure detection target list, the physical device information including information for identifying the physical device; and
comparing the failure detected during use of the physical device by the virtual machine with the failure detection target list,
wherein the notifying step takes place in a case where the failure detected during use of the physical device by the virtual machine matches physical device information stored in the failure detection target list.

9. A non-transitory computer-readable medium storing a program comprising instructions for causing an information processing device, having a physical device connected thereto, to realize:
a virtual machine built in the information processing device and able to use the physical device of the information processing device; and an information processing device failure managing unit, external to the virtual machine, configured to detect a failure in the information processing device, the program further comprising instructions for causing the virtual machine to realize:
- a virtual machine failure managing unit configured to detect a failure in the physical device when the physical device is in use by the virtual machine; and
- a failure notifying unit that provides notification of an occurrence of the failure in the physical device detected by the virtual machine failure managing unit to the information processing device failure managing unit, the failure being one that that the information processing device failure management unit cannot detect during use of the physical device by the virtual machine.

10. The non-transitory computer-readable medium storing the program according to claim 9,
wherein the program further comprises instructions for causing the information processing device to realize, in the virtual machine, a list storing unit storing physical device information into a failure detection target list, the physical device information including information for identifying the physical device, and
wherein the program yet further comprises instructions for comparing the failure detected during use of the physical device by the virtual machine with the failure detection target list, such that the failure notifying unit provides notification of the occurrence of the failure in a case where the failure is a match with one stored in the failure detection target list.

11. The information processing device according to claim 2, wherein,
the failure notifying unit has a connection controlling unit that controls a connection between the virtual machine failure managing unit and the information processing device failure managing unit, and
when the virtual machine failure managing unit detects the failure in the physical device, the connection controlling unit connects the virtual machine failure managing unit and the information processing device failure managing unit.

12. The information processing device according to claim 2, wherein,
the failure notifying unit has a shared memory which the virtual machine failure managing unit and the information processing device failure managing unit can read from and write into, respectively, and
the virtual machine failure managing unit stores, into the shared memory, the physical device information including information for identifying the physical device where the failure has been detected.

* * * * *